US008621484B2

(12) United States Patent
Ohly et al.

(10) Patent No.: US 8,621,484 B2
(45) Date of Patent: Dec. 31, 2013

(54) HANDLING POTENTIAL DEADLOCKS AND CORRECTNESS PROBLEMS OF REDUCE OPERATIONS IN PARALLEL SYSTEMS

(75) Inventors: Patrick Ohly, Bonn (DE); Victor Shumilin, Sarov (RU)

(73) Assignee: Intel Corporation, Santa Clara, CA (US)

( * ) Notice: Subject to any disclaimer, the term of this patent is extended or adjusted under 35 U.S.C. 154(b) by 1345 days.

(21) Appl. No.: 11/897,480

(22) Filed: Aug. 30, 2007

(65) Prior Publication Data

US 2009/0064176 A1  Mar. 5, 2009

(51) Int. Cl.
*G06F 3/00* (2006.01)

(52) U.S. Cl.
USPC .......................................... 719/313; 719/310

(58) Field of Classification Search
None
See application file for complete search history.

(56) References Cited

U.S. PATENT DOCUMENTS

| 5,774,386 | A  | * | 6/1998 | Pawle | 708/290 |
|---|---|---|---|---|---|
| 2004/0083317 | A1 | * | 4/2004 | Dickson et al. | 710/22 |
| 2005/0273478 | A1 | * | 12/2005 | Ehrman | 708/200 |
| 2006/0282838 | A1 | * | 12/2006 | Gupta et al. | 719/313 |
| 2006/0294297 | A1 | * | 12/2006 | Gupta | 711/108 |
| 2007/0242611 | A1 | * | 10/2007 | Archer et al. | 370/242 |
| 2008/0104367 | A1 | * | 5/2008 | Blumrich et al. | 712/11 |

OTHER PUBLICATIONS

High Performance Computing Course MPI Tutorial, Delft University of Technology Information Tech. and System, Sep. 2002, pp. 1-22.*
"Mobile MPI Programs in Computational Grids", Fernandes, 2006, pp. 1-10.*
"OMPI: Optimizing MPI programs using Partial Evaluation", Ogawa, 1996, pp. 1-18.*
"Improving Distributed Memory Applications Testing by Message Perturbation", Vuduc, 2006, pp. 1-9.*
U.S. Appl. No. 11/390,013, filed Mar. 27, 2006, entitled "Methods and Apparatus to Perform Distributed Memory Checking," by Patrick Ohley, et al.
Jeffrey S. Vetter, et al., "Dynamic Software Testing of MPI Applications with Umpire," May 2000, pp. 1-10.
V. Samofalov, et al., "Automated Correctness Analysis of MPI Programs with Intel Message Checker," 2006, pp. 900-907.
Intel® Trace Collector 7.0.1, User's Guide, Chapter 4, "Correctness Checking," 1996-2007, pp. 31-42.
J.L. Traff, et al., "The MPI/SX Collectives Verification Library," 2006, pp. 908-916.
Bettina Krammer, et al., "Correctness Checking of MPI One-Sided Communication Using MARMOT," 2006, pp. 1-20.
Glenn Luecke, et al., "MPI-Check: A Tool for Checking Fortran 90 MPI Programs," Nov. 6, 2007, pp. 1-8.

* cited by examiner

*Primary Examiner* — Tuan Dao
(74) *Attorney, Agent, or Firm* — Trop, Pruner & Hu, P.C.

(57) ABSTRACT

In one embodiment, the present invention includes a method for executing a first reduction operation on data in an input buffer, executing a second reduction operation on the data, where the second reduction operation has a higher reliability than the first reduction operation, and comparing the first and second results. Other embodiments are described and claimed.

12 Claims, 4 Drawing Sheets

US 8,621,484 B2

HANDLING POTENTIAL DEADLOCKS AND CORRECTNESS PROBLEMS OF REDUCE OPERATIONS IN PARALLEL SYSTEMS

BACKGROUND

Message passing serves as an effective programming technique for exploiting coarse-grained concurrency on distributed computers, as seen in the popularity of the Message Passing Interface (MPI). Unfortunately, debugging message-passing applications can be difficult. Analysis tools for MPI applications produce tracefiles that can be analyzed with a trace analyzer performance analysis tool. In MPI processes, such tools record calls to the MPI library and transmitted messages, and allow arbitrary user-defined events to be recorded. Instrumentation can be switched on or off at runtime. While such tools can aid in detecting errors, current correction checking tools cannot adequately detect transmission and implementation problems for various operations, such as reduce operations.

Hardware, driver and system software problems can introduce bit errors into data transmitted between processes in a parallel application or lead to truncated transmissions. Traditionally, checksums are used to detect errors. Error correction codes help to reconstruct the original data. This can be done at all levels in a communication stack as well as added to it at the application level. Parallel reduce operations differ from verbatim transmission of data in that they modify the data in some configurable and perhaps programmable way while the data is in transmission.

In addition, deadlocks caused by communication between processes in parallel applications can occur. Such deadlocks may include actual or real deadlocks, as well as potential deadlocks, which are deadlocks that only occur on specific platforms or configurations and thus cannot be detected using traditional monitoring of application progress and/or timeouts, as with actual deadlocks. Accordingly, current correction checking tools cannot adequately detect potential conflicts.

DETAILED DESCRIPTION

Embodiments may detect incorrect execution of a reduce operation without requiring changes inside a communication stack or in an application using the communication stack. Embodiments may be based on the fact that a reduce operation can be executed twice without violating the semantic of the call: once using a first implementation which is to be checked and which might produce incorrect results or fail, then once more with a second implementation (e.g., a more reliable implementation) that protects itself better against network problems and/or uses different algorithms to avoid implementation mistakes. In some embodiments both executions of the operation may use original buffers provided by the application, as the original memory layout might be hard to reproduce and an application callback might expect that memory layout. Note that while the order of reliable and original implementation may enable the output buffer to contain the correct results afterwards, the other order also works, either without correcting incorrect results or by copying the correct result from the intermediate buffer over the output buffer at the end.

The Message Passing Interface (MPI) is one example of a standard which defines several reduce operations. They are implemented by one function per operation that each process in a communication context must call once to complete the operation. Each function is passed a buffer with the input data, a buffer for the resulting data and additional information. One of these parameters determines which operation is to be applied to the data. Possible operations include: MIN, MAX, SUM of integer and floating point values; bit operations on integer values; and transformations implemented by an application callback.

The different reduce operations have different semantics regarding how the data is processed and who receives the results. Some examples, each of which may correspond to a different application programming interface (API), are: MPI_Reduce( ) which applies the indicated operation to all input data and stores result in one root process; MPI_Allreduce( ), which performs in the same memory and stores results on all processes; MPI_Scan( ), which is prefix reduction, i.e., for each process the operation is applied to the input data of all preceding processes and its own input and the result stored in the processes. Of course, embodiments can be used in connection with other reduce operations.

Figure 1:
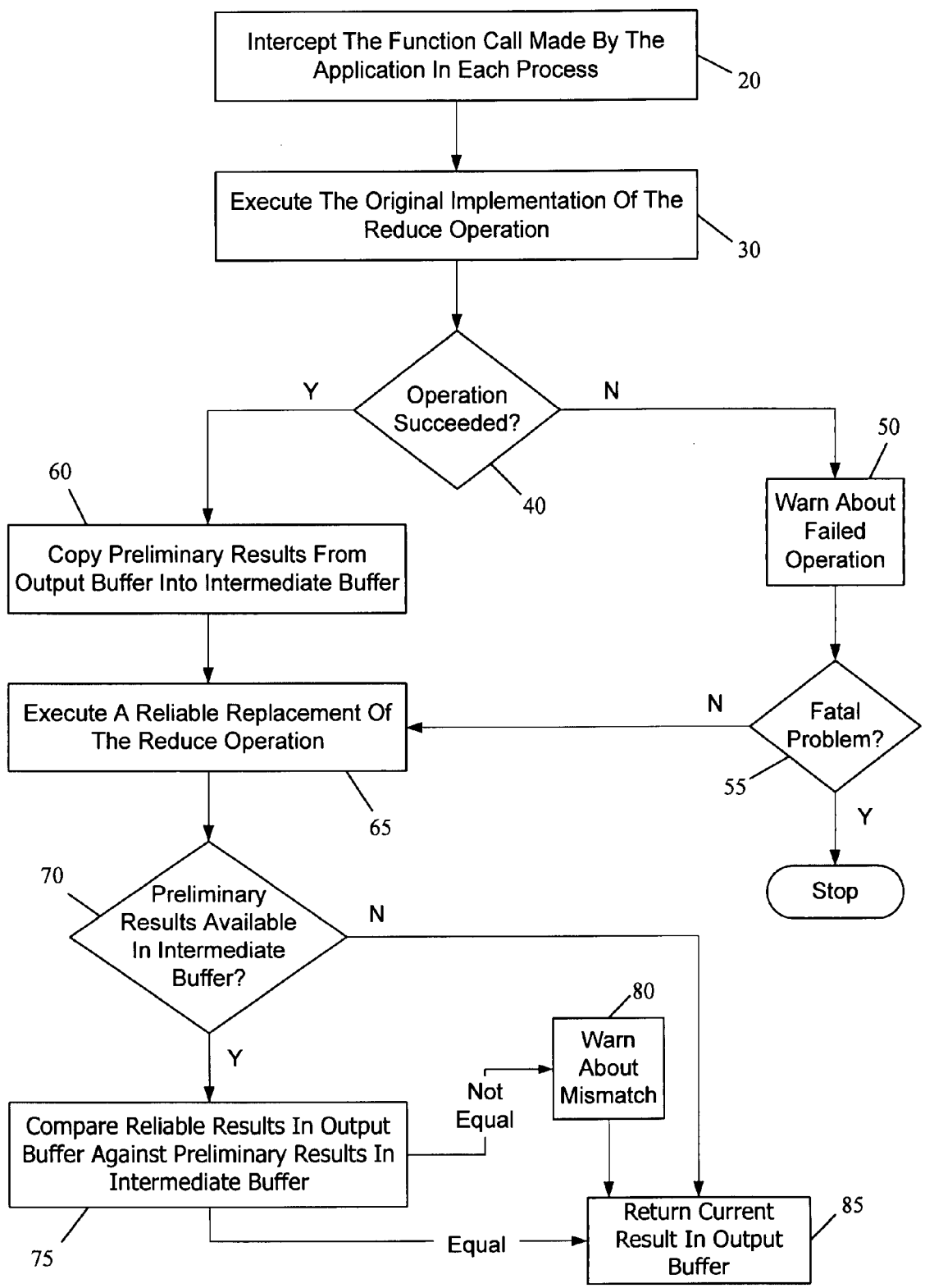
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may begin by intercepting a function call made by an application in each process (block 20). A correctness checking library may intercept the call, in one embodiment. Then a first (e.g., an original) implementation of a reduce operation may be executed (block 30). Next, it may be determined whether the operation was successful (diamond 40). If not, control passes to block 50 where a warning may be generated regarding the failed operation. In various embodiments, such warning message may be sent to an error log, although in other implementations, the warning may be sent to further locations, such as a trace collector or analyzer, for example. Next, it may be determined if the problem is fatal (diamond 55). If so, execution of the method may conclude. Otherwise, control passes to block 65, discussed further below.

Referring still to FIG. 1, if at diamond 40 it is determined that the first reduce operation is successful, the preliminary results may be copied from an output buffer in which the results are written into an intermediate buffer (block 60). Then, a second reduce operation, e.g., a more reliable reduce operation, may be executed. For example, each process sends data from its input buffer along with a checksum to the root process, the root process checks the received data and accumulates them using a specified operation. Then it may be determined whether the preliminary results are available in the intermediate buffer (diamond 70). If not, results of the second reduce operation may be returned (block 85).

Referring still to FIG. 1, if instead at diamond 70 it is determined that preliminary results are available in the intermediate buffer, control passes to diamond 75. At block 75, the results of the second reduce operation present in the output buffer may be compared against the preliminary results in the intermediate buffer. The result of the original implementation in this intermediate buffer is checked after executing the reliable implementation by comparing the final output buffer against the intermediate buffer element-by-element. Based on the comparison it may be determined whether the results are equal or not. Two floating point values may be considered equal if they do not differ by more than a certain error delta, whereas integer values should match exactly. If the results are equal, the result may be returned immediately (block 85). Otherwise, a warning regarding a mismatch may be generated and sent (block 80), e.g., to the error log. Still further, control may pass to block 85 for returning results of the first or the second reduce operations.

While shown with this particular implementation in the embodiment of FIG. 1, the scope of the present invention is not limited in this regard. For example, in some embodiments in addition to the preliminary result, the original value in the input buffer on which the reduce operation is performed may be copied to another buffer for later comparison if a certain function call is made, for example, if the MPI-2 MPI_IN_PLACE functionality is used. This may be done because with MPI_IN_PLACE, the original MPI implementation will overwrite the input data in the input buffer with the result. Because they are only used internally, these intermediate buffers can have an arbitrary organization as long as the order of all elements of the original buffer is preserved. Note that the steps necessary to handle MPI_IN_PLACE are not shown in FIG. 1 for simplicity.

In this embodiment, by executing the reliable implementation last, the application's output buffer always contains the correct result at the end, and a fatal error which prevents execution of the original implementation is detected sooner. Alternatively the order of the reduce operations could be reversed, with one additional, optional step at the end to overwrite incorrect results with correct ones if error correction is desired in addition to error detection.

Figure 2:
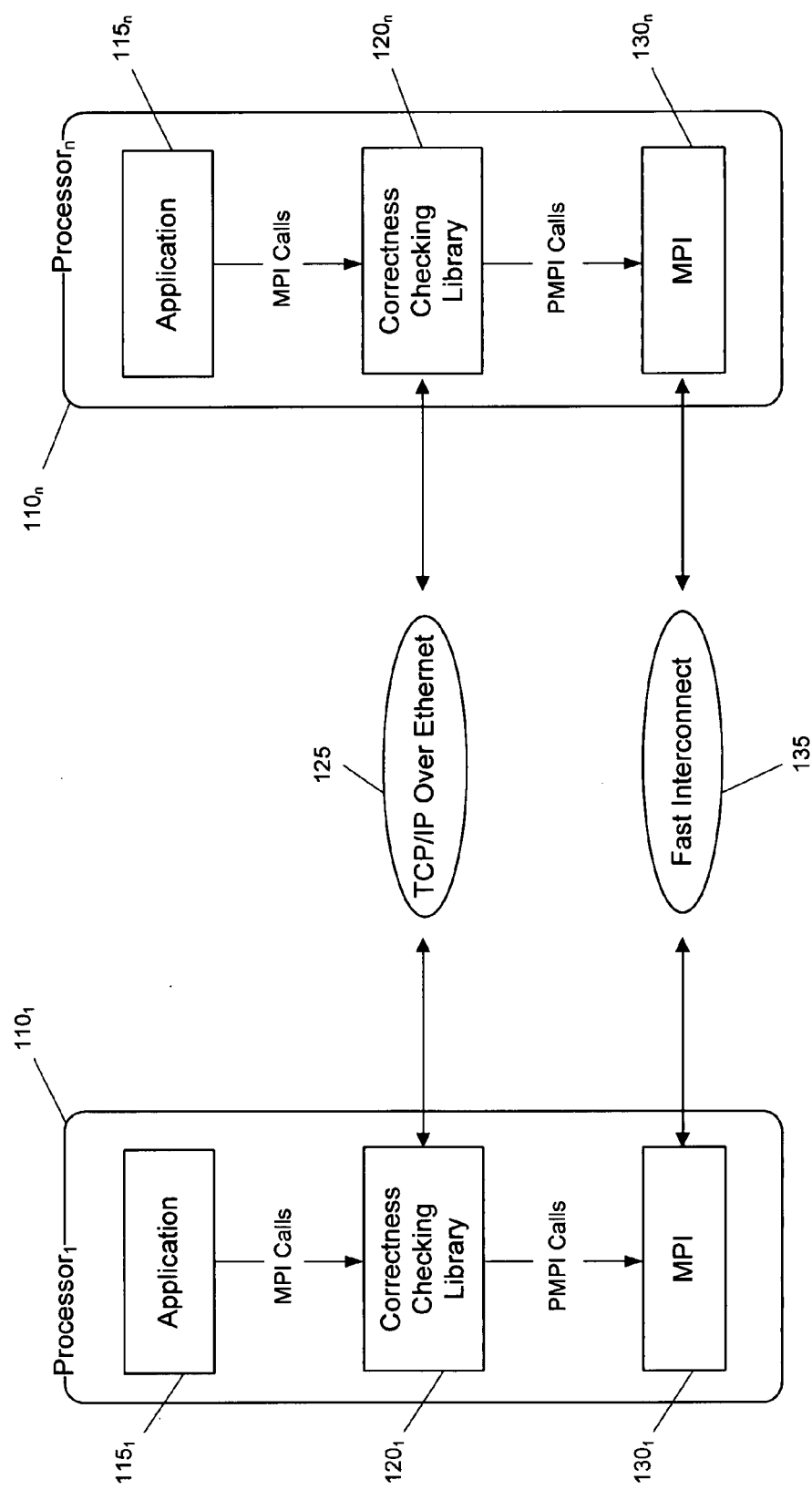
FIG. 2 is a block diagram of the interrelation between multiple processes in accordance with an embodiment of the present invention.

Interception of MPI calls can be done by a separate library using the MPI Profiling Interface (PMPI), via an additional layer of indirection in an MPI implementation, using binary instrumentation, or in another such manner. FIG. 2 shows an embodiment in which the reliable reduce operation is executed by exchanging data over an Ethernet interconnect. Shown in FIG. 2 is a block diagram of the interrelation between multiple processes in accordance with an embodiment of the present invention. As shown in FIG. 2, a plurality of processors $110_1$-$110_n$ (generically processor 110) are present. Each processor may include a process or application $115_1$-$115_n$ (generically application 115). In some embodiments, the example system of FIG. 2 is an exemplary distributed application which is cooperatively implemented via generally contemporaneous execution of machine accessible instructions of multiple processors 110. In particular, a first process (i.e., software application $115_1$) may be executed on first processor $110_1$ and a second software application $115_n$ may be executed by second processor $110_n$, which cooperatively realize the example distributed application using any variety of distributed computing algorithms, techniques and/or methods. In the example system of FIG. 2, the example software applications 115 implement different machine accessible instructions. Alternatively, the example software applications may implement similar and/or identical machine accessible instructions.

For simplicity and ease of understanding, the following disclosure references the example two processor system of FIG. 2. However, distributed applications and/or the methods and apparatus disclosed herein to perform distributed reduction operations may be implemented by systems incorporating any number and/or variety of processors. For example, one or more processes of a distributed application may be implemented by a single processor, a single process may be implemented by each processor, etc. Applications 115 may be developed using any variety of programming tools and/or languages and may be used to implement any variety of distributed applications. In the example system of FIG. 2, processors 110 may be implemented within a single computing device, system and/or platform or may be implemented by separate devices, systems and/or platforms. Further, processors 110 may execute any variety of operating system(s).

As further shown in FIG. 2, each application 115 may make application programming interface (API) calls to a library. More specifically, API calls (and more particularly MPI calls) may be made to a correctness checking library $120_1$-$120_n$ (generically library 120). In various embodiments, these libraries 120 may perform reduction operations in accordance with an embodiment of the present invention. For example, libraries 120 may perform more rigorous reduce operations, which may be generated by transmission over an interconnect 125, which in one embodiment may be an Ethernet connection that communicates according to a transmission control protocol/internet protocol (TCP/IP) over Ethernet, although the scope of the present invention is not limited in this regard.

Libraries 120 thus intercept each API call made by an associated software application, potentially modify the intercepted calls, and then, among other things, call the API function specified by the intercepted API call. Further, the example libraries of FIG. 2 implement a second reduce operation for each API call utilized by applications 115.

When a software application (e.g., process $115_1$) sends application data to another software application (e.g., process $115n$) via an MPI message that is associated with a reduce operation, library 120 associated with the software application intercepts the MPI call made by the sending process 115 to a corresponding messaging interface (also referred to as MPI modules) $130_1$-$130_n$ (generically interfaces 130) of FIG. 2, which facilitate the exchange of, for example, distributed application messages, between applications 115. Library 120 then calls the original MPI function specified by the intercepted MPI call and provided by the messaging interface 130 to send the application data via a first MPI message to the receiving processor 110.

In addition, libraries 120 may also generate PMPI calls to MPI modules $130_1$-$130_n$. In turn, these MPI modules 130 may perform reduce operations which may be transmitted via a second interconnect 135 which, in one embodiment may be a fast interconnect such as a point-to-point interconnect, although the scope of the present invention is not limited in this regard.

Messaging interfaces 130 may implement a library and/or a run-time system implementing messaging functions in accordance with a messaging passing interface (MPI) standard for distributed applications. However, the messaging interface 130 may implement any variety of additional and/or alternative messaging interface(s) for distributed computing processes. In the example system of FIG. 2, the example messaging interfaces 130 provide APIs to allow applications 115 to interact with each other.

Other implementations are possible, for example, by using the original MPI communicator and additional collective calls to transmit data, or an additional communicator and point-to-point messages. Any number of communication contexts may be used to facilitate communications between the processes implementing a distributed application. In the example of FIG. 2, MPI communicators may be used to define one or more communication contexts. MPI communicators specify a group of processes inside and/or between which communications may occur, such as to logically group the processes 115 to form the example distributed application of FIG. 2 (i.e., application MPI communicators). A distributed application may include more than one MPI communicator, for example, an MPI communicator by which all of the processes of the distributed application may communicate (i.e., a global MPI communicator), an MPI communicator between two specific processes of the distributed application (i.e., a point-to-point MPI communicator), etc. Note that sending point-to-point messages on the original communicator might interfere with message operations started by the application and thus would change the semantic in an incorrect way.

As described above, potential deadlocks exist in MPI applications because the standard does not specify whether some data transmission primitives block until the recipient is ready to receive the data or buffer the data and let the caller proceed. A typical example is a head-to-head send in which a first process issues a MPI_Send( ) to a second process and a second process issues a MPI_Send( ) to the first process. Accordingly, a potential deadlock may exist between issuance of these send calls and a corresponding receive call on each process, i.e., a MPI_Recv( ) call in the first process and a MPI_Recv( ) call in the second process. If the implementation of MPI_Send( ) or the network buffers the messages sent by that call, then both processes continue to the MPI_Recv( ) call and the application proceeds. However, if the MPI_Send( ) call waits for the recipient to enter its MPI_Recv( ) call, then the application deadlocks. Other sources of non-deterministic data transmission are collective operations such as a broadcast communication, e.g., MPI_Bcast( ), where the sending process(es) may or may not proceed before their recipients are ready to receive.

Embodiments may enable interception of non-deterministic message send calls and implement them using deterministic primitives which are guaranteed to wait for the recipient of the message. In addition, a synchronizing collective call may be added to non-deterministic collectives, thus ensuring that they always block until all involved processes enter them. Then another component detects real deadlocks, using one or more conventional methods such as timeouts, progress monitoring, etc.

Figure 3:
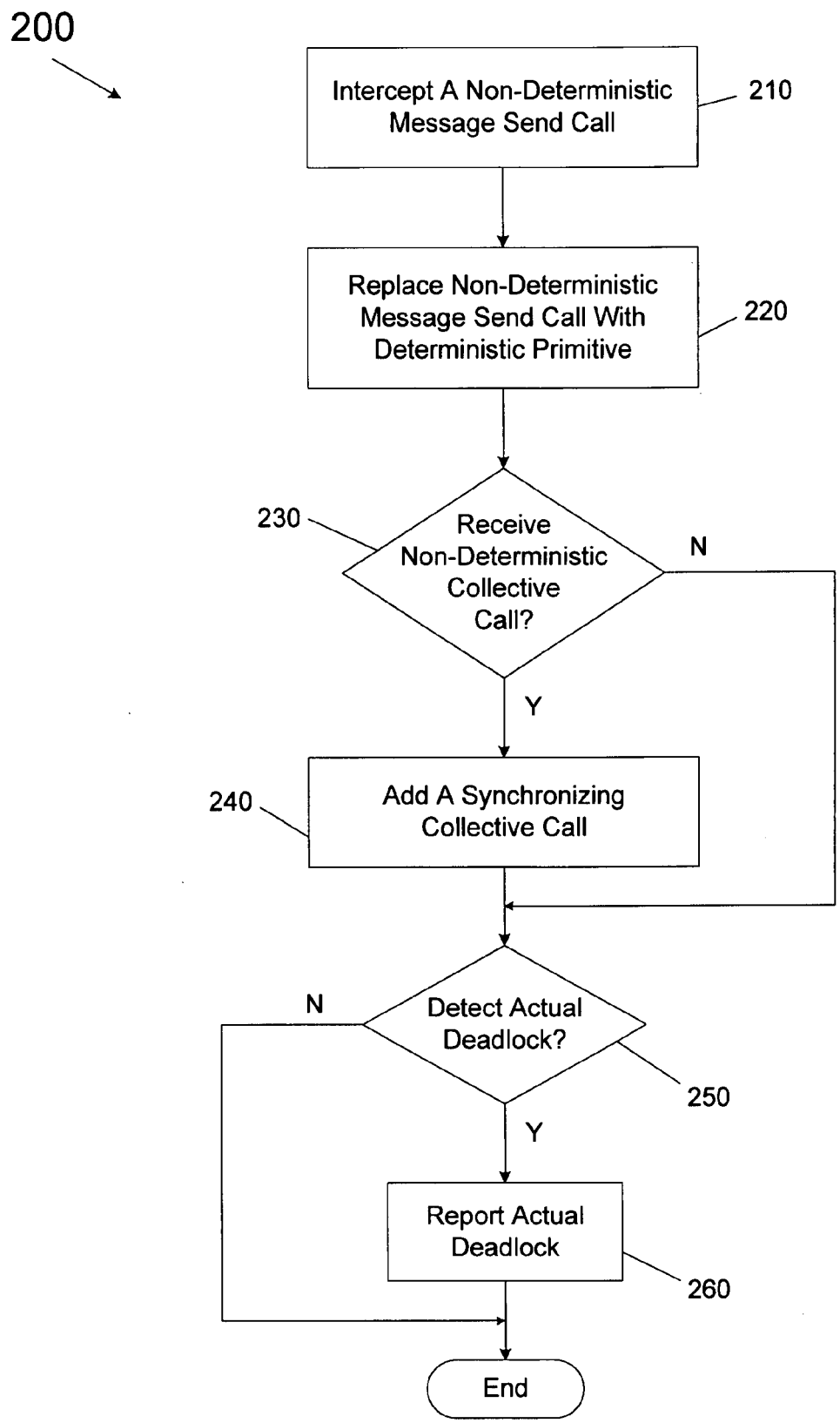
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 may be used to detect the presence of potential deadlocks. As shown in FIG. 3, method 200 may begin by intercepting a non-deterministic message send call (block 210). For example, an error correctness checking library may receive such a call from a first process to a second process. The library may then replace the non-deterministic message send call with a deterministic primitive (220). Such primitive may guarantee that a waiting period occurs such that the recipient receives the message.

Referring still to FIG. 3, it may be determined also whether a non-deterministic collective call has been received (diamond 230). Such a collective call may correspond to a broadcast message, although the scope of the present invention is not limited in this regard. If such a message call is received, the correctness checking library may add a synchronizing collective call to the non-deterministic collective call (block 240). For example, the deterministic collective may ensure that other calls are blocked until all processes enter the collective call.

Referring still to FIG. 3, normal execution may continue after insertion of these primitives and calls as indicated. Then, it may be determined whether an actual deadlock has been detected (diamond 250). While the scope of the present invention is not limited in this regard, such detection may be via traditional deadlock detection mechanisms such as timers, progress monitoring or so forth. If such an actual deadlock occurs, the deadlock may be reported (block 260). For example, an error log may report the deadlock, or a message may be sent to another location. Accordingly, method 200 concludes. While shown with this particular implementation in the embodiment of FIG. 3, the scope of the present invention is not limited in this regard.

Table 1 below shows how embodiments may be applied to MPI communications. Note that a MPI_Barrier( ) call could be added to all collective operations; using one-to-many or many-to-one operations instead is an optimization that can be done if the synchronization in the other direction is already guaranteed by the original call. Alternatively a combination of one-to-many and many-to-one calls could be used to achieve the same effect.

TABLE 1

| MPI Primitive(s) | Original Behavior | Deterministic Substitute for MPI Primitive(s) |
| --- | --- | --- |
| MPI_Send( ) | May or may not wait for recipient, depending on interconnect, message size, etc. | MPI_Ssend( ) |
| MPI_Isend( ) + MPI_Wait/Waitall/Waitany( ) | The non-blocking MPI_Isend( ) will always return, but the corresponding wait call which is required to check for completion of the send may or may not block, just like MPI_Send( ). | MPI_Issend( ) instead of MPI_Isend( ) |
| MPI_Send_init( ) + MPI_Start/Startall( ) + MPI_Wait/Waitall/Waitany( ) | The wait call may or may not block, just like MPI_Send( ). | MPI_Ssend_init( ) instead of MPI_Send_init( ) |
| MPI_Bcast/Scatter( ) etc. | In one-to-many collective operations some processes send data and may or may not wait for the receiving processes; if no data has to be transmitted, the communication may or may not be skipped. | original call plus a many-to-one or all-to-all collective call which requires communication |
| MPI_Reduce/Gather( ) etc. | Many-to-one collectives have similar problems as one-to-many, only the role of processes is reversed. | original call plus a one-to-many or all-to-all collective call which requires communication |
| MPI_Alltoallv( ) etc. | Many-to-many may or may not | original call plus a barrier |

TABLE 1-continued

| MPI Primitive(s) | Original Behavior | Deterministic Substitute for MPI Primitive(s) |
|---|---|---|
| | block if some processes have no data to send or messages are buffered. | |

Note that in some embodiments a method such as that described with regard to FIG. 3 may be implemented in the system of FIG. 2. In these embodiments, correctness checking libraries 120 may intercept MPI calls and insert the deterministic calls before forwarding to interfaces 130. Then interconnect 125 may monitor progress, e.g., via transmission of control messages between applications 115 to detect when an actual deadlock exists during execution of code including the deterministic primitives. However, other configurations are possible. For example, call replacement may be done inside interfaces 130, e.g., via a configuration option, via dynamic function replacement of binary instrumentation.

Accordingly, embodiments may reliably detect potential deadlocks in code. Still further, embodiments may be implementation-generic and may be used with empty messages. Embodiments thus provide flexibility that can enable dynamic changing of the code changes on a case-by-case basis. Thus embodiments may detect potential deadlocks by turning them into real deadlocks via function interception. Still further, some embodiments may suppress triggering of a deadlock for specific send operations that a user has found already, but cannot fix. Furthermore, embodiments may be configurable such that only potential deadlocks for messages larger than a configurable size may be triggered.

Figure 4:
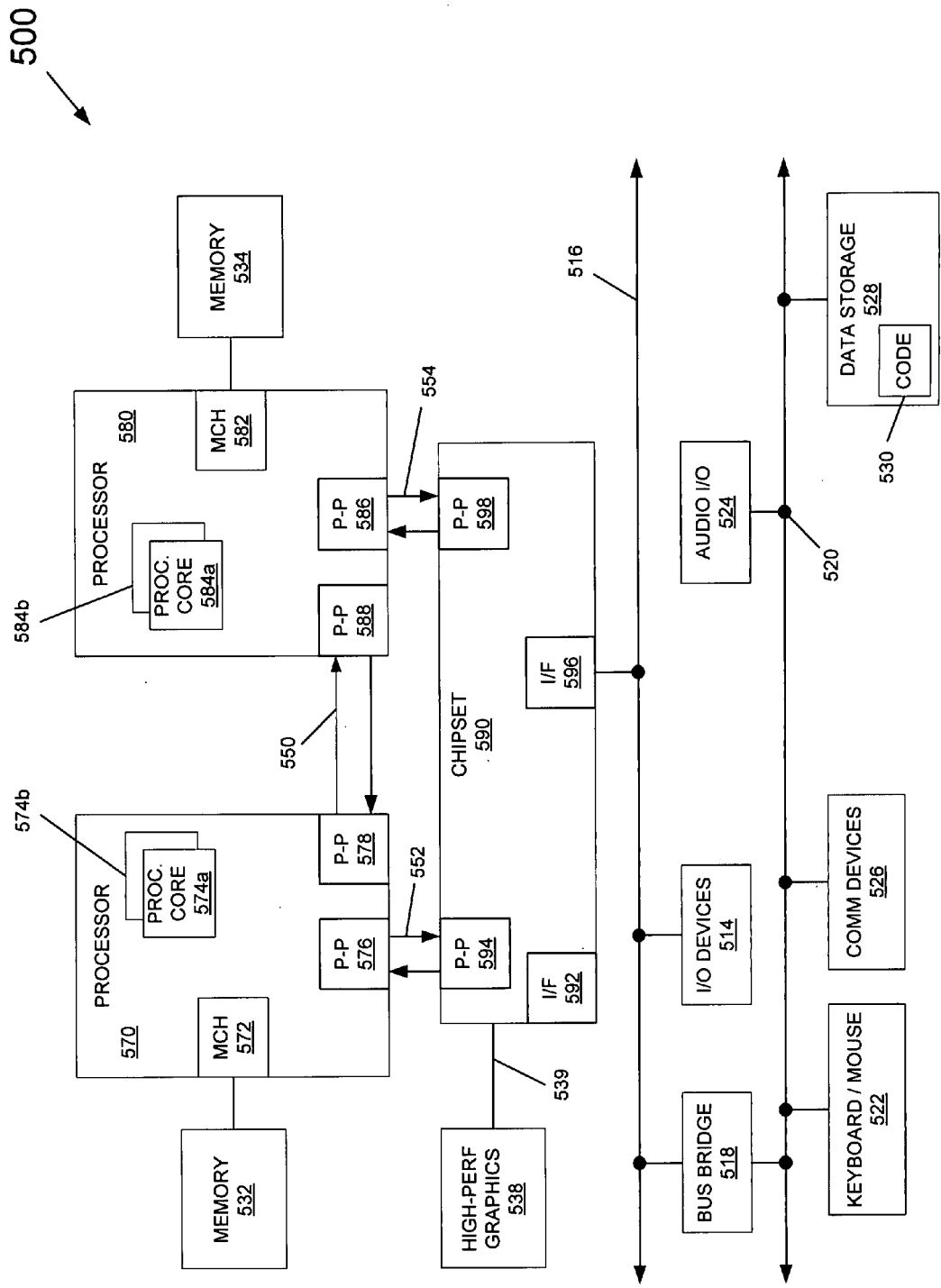
FIG. 4 is a block diagram of a multiprocessor system in which embodiments of the present invention may be used.

Embodiments may be suited for many different types of platforms. Referring now to FIG. 4, shown is a block diagram of a multiprocessor system in which embodiments of the present invention may be implemented. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 4, each of processors 570 and 580 may be multi-core processors including first and second processor cores (i.e., processor cores 574a and 574b and processor cores 584a and 584b), although other cores and potentially many more other cores may be present in particular embodiments.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538 via a bus 539.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising a non-transitory machine-accessible medium including instructions that when executed cause a system to perform operations comprising:
    intercepting a function call and modifying the function call to determine a modified function call;
    executing a first reduction operation on data in an input buffer and storing a first result of the first reduction operation in a second buffer;
    after executing the first reduction operation, executing a second reduction operation on the data in the input buffer, the second reduction operation corresponding to a reduction operation having a higher reliability than the first reduction operation based on at least one of fewer network problems and differing reduction algorithms, and storing a second result of the second reduction operation in an output buffer; and
    comparing the first result and the second result and reporting an error if the first and second results do not match;
    wherein (a) the function call corresponds to one of the first and second reduction operations, (b) the modified function call corresponds to another of the first and second reduction operations, and (c) the first result and the second result match if they differ by less than a predetermined amount.

2. The article of claim 1, wherein the data corresponds to message passing interface (MPI) data and further comprising transmitting one of the first and second results from a first process to a second process.

3. The article of claim 2, wherein the first result is transmitted from the first process to the second process according to a MPI communication scheme along a first interconnect and the second result is transmitted from the first process to the second process along a second interconnect according to an internet protocol.

4. The article of claim 2, wherein the first result and the second result are floating point values.

5. The article of claim 4, the operations further comprising providing a warning message to the error log if the comparison results in a mismatch between the first result and the second result.

6. The article of claim 1, the operations further comprising copying the data in the input buffer into a third buffer and providing the data from the third buffer for execution of the second reduction operation if the first reduction operation is executed in place, and further comprising writing the first result to the input buffer.

7. The article of claim 1, the operations further comprising determining whether the first reduction operation is successful and if not, indicating a failure to an error log.

8. The article of claim 1, the operations further comprising copying the first result from the output buffer to the second buffer before comparing the first result and the second result.

9. The article of claim 1, wherein the higher reliability is based on fewer network problems when the first and second reduction operations operate in the same network.

10. An article comprising a non-transitory machine-accessible medium including instructions that when executed cause a system to:
  execute a first reduction operation on message passing interface (MPI) data in an input buffer, store a first result of the first reduction operation in an output buffer, and copy the first result from the output buffer to an intermediate buffer;
  after executing the first reduction operation, execute a second reduction operation on the data in the input buffer, the second reduction operation corresponding to a reduction operation having a different reduction algorithm than the first reduction operation, and store a second result of the second reduction operation in the output buffer;
  determine whether the first result is still included in the intermediate buffer; and
  when the first result is still included in the intermediate buffer compare the first result and the second result but when the first result is not still included in the intermediate buffer then return the second result without comparing the first result and the second result;
  wherein the first result and the second result match if they differ by less than a predetermined amount.

11. The article of claim 10, further comprising instructions that when executed enable the system to transmit at least one of the first and second results from a first process to a second process according to a MPI communication scheme along a first interconnect or a second interconnect according to an internet protocol.

12. The article of claim 11, further comprising instructions that when executed enable the system to copy the data in the input buffer into a second intermediate buffer and provide the data from the second intermediate buffer for execution of the second reduction operation if the first reduction operation is executed in place.

* * * * *